Nov. 3, 1931.  I. PODLIASKY  1,830,175
THERMIONIC TUBE CIRCUIT
Filed March 17, 1927
Fig. 1
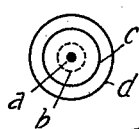
Fig. 2
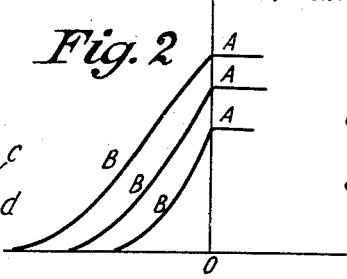
Fig. 2
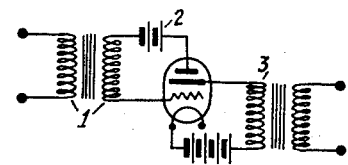
Fig. 4
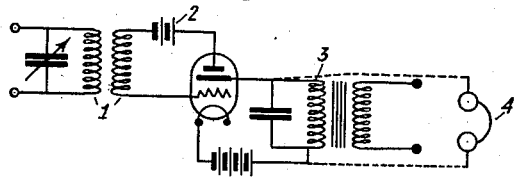
Fig. 3
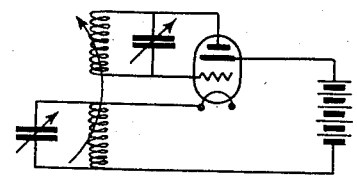
Fig. 5
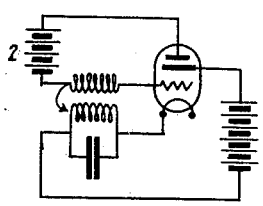
Fig. 6
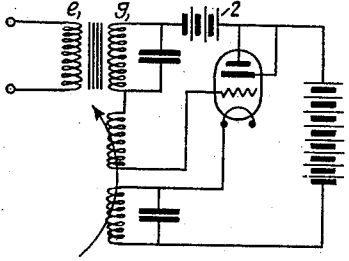
Fig. 6-a
Fig. 7
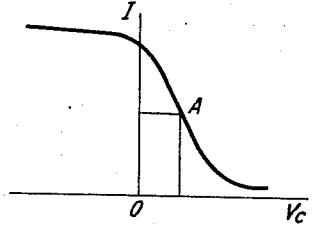
Fig. 8
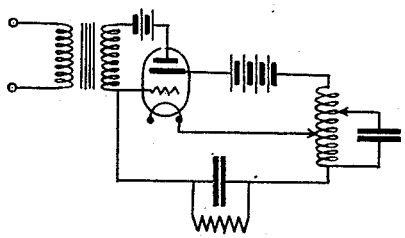
Fig. 9
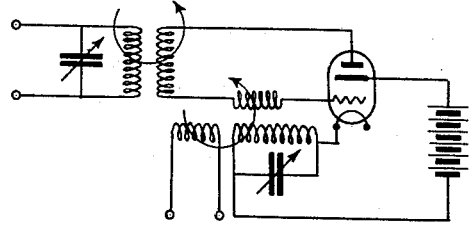
INVENTOR
I. PODLIASKY
BY Ira J. Adams
ATTORNEY Patented Nov. 3, 1931

1,830,175

UNITED STATES PATENT OFFICE

ILIA PODLIASKY, OF PARIS, FRANCE

THERMIONIC TUBE CIRCUIT

Application filed March 17, 1927, Serial No. 175,998, and in France March 17, 1926.

It is an object of the present invention to provide a vacuum or thermionic tube having four elements, the extra element being an auxiliary or secondary plate in addition to the one found in the usual triode.

A further object of the invention is to dispose the elements with respect to each other and the wall of the tube in a novel manner. A still further object is to vary the anode current of a tube in a novel manner by regulating the potential difference between the grid and secondary plate.

A further object is to provide novel means for detecting high frequency currents. A still further object is to provide novel connections with a vacuum tube for using the same as a generator, or as a generator and modulator together, of high frequency currents. Further objects will appear as the description proceeds and will be pointed out in the accompanying claims.

A preferred form of the invention is shown in the accompanying drawings, in which, Fig. 1 is a diagrammatic view of the elements as arranged with respect to each other.

Fig. 2 shows the current characteristics of a tube made according to my invention.

Fig. 3 shows a circuit using the tube as a detector.

Fig. 4 shows the circuits used for connecting two tubes in cascade for use as an amplifier.

Fig. 5 shows a circuit in which the tube is used as an oscillation generator.

Fig. 6 shows the tube being used as a self-modulating generator.

Fig. 6a shows the tube being used as a phone controlled, modulating generator.

Fig. 7 shows a function of a tube as connected in Fig. 6.

Figs. 8 and 9 show further circuits in which the tube is used as a generator of a modulated wave.

The present invention relates to the construction and to applications of a thermionic tube comprising a hot cathode or filament, a perforated electrode (grid) and two plates. The plate farthest removed from the filament may have the form of a solid surface or have the shape of a grating. The electrodes may be either cylindrical or plane. In the case of the cylindrical construction, the filament may consist of a straight wire, for instance. The grid may be given all forms customary in the ordinary type of triode, and it may be disposed, for instance, concentric with reference to the filament.

For example, an imperforate and cylindrical plate is placed exterior with relation to the grid. Furthermore, a second imperforate or perforated plate is placed exterior to the first plate. Hence, from the inside to the outside of the tube, there are disposed successively (see Fig. 1) : filament $a$, grid $b$, imperforate plate or anode $c$, and the second imperforate or perforated plate $d$. The latter may have dimensions longitudinally that are far smaller than that of the anode; for instance, its dimensions may be reduced to those of a simple ring. In the majority of applications of this tube, the four electrodes hereinbefore described form a part of two distinct circuits having no common point between themselves. We shall denote them as the input and the output, or the controlling and the controlled, circuits, respectively. In other applications, the two circuits may be coupled magnetically, electrostatically or galvanically, and may thus have points in common.

The majority of applications are based upon the characteristic properties of this tube outlined roughly as follows:

The input circuit comprises the grid and the outside plate, and between the two, a p. d. is set up supplied from a battery of cells, for instance. The output circuit comprises the filament, the inside plate (anode), a D. C. source (cell) and a current measuring instrument or other signal responsive means. The negative pole of the cell is united with the cathode and the positive pole with the anode.

Under these conditions, what is known as the static characteristic has a form as shown graphically in Fig. 2. These curves show the potential differences between the input electrodes (abscissæ) plotted against the corresponding anode current (ordinates), the abscissa values to the lefthand side of the origin standing for negative grid potentials. There are shown three curves, each corresponding to a definite value of the anode potential. It will be found at the same time, by providing a sensitive galvanometer in the input circuit, that the current in the input circuit is always of zero value regardless of what may be the sense of the E. M. F. applied to this circuit. Indeed, this current will appear only when ionization of the residual gases in the bulb occurs or when secondary electrons are given off from the anode, or else again, when the anode by being sufficiently heated by thermionic emission from the filament is itself changed into an incandescent filament. These three phenomena are systematically avoided in the majority of applications; indeed, one of the most important features of the tube is the absence of any current in the control circuit.

Since the upper bends or knees in the static characteristics are very sharp and sudden, and as the characteristics themselves are sensibly rectilinear over a certain part thereof beyond the knee, the tube may show a behavior like an ideal rectifier or detector between certain voltage values applied at the input circuit. An ideal rectifier or detector will have to show the following features:

1. The expenditure of real (watt) energy or power in its input circuit should be sensibly of zero value.

2. Inside the limits of use, one of the alternations of the E. M. F. applied at the input circuit will be entirely suppressed in the output circuit, the other half-cycle being totally transmitted and without distortion of the wave (the instantaneous values being simply proportional in the two circuits).

3. Operation, inside wide limits, is independent of the frequency of the applied E. M. F.

In the tube forming the object of the present invention, the foregoing three demands are very nearly fulfilled if the circuit arrangements are chosen as shown in Fig. 3 and if the working point is chosen at A of the characteristic shown in Fig. 2. By convenient selection of the metals constituting the grid and the plates (such selection to be governed by the difference of contact potential of these metals), this allows of bringing the sudden bend in the characteristic (operating point for detection) as close to "zero" abscissa (second plate and grid at equal potential) as may be desired. A battery of cells whose potential may be varied is inserted in the input circuit facilitates this operation, no matter what metals may be selected. In Fig. 3, 1 denotes the transformer tuned to the high frequency of the potential to be detected or rectified, 2 is the polarization cell, 3 the audio-frequency transformer, 4 the telephone receiver which may be substituted if desired in place of the low-frequency transformer.

If the tube is suitably proportioned, it is possible to detect without appreciable distortion considerable potentials and change them into low-frequency currents of sufficient strength for direct connection of consuming apparatus (for instance, loud-speakers), and without the necessity of further amplifying the ensuing audio-frequency currents. A radio-phonic receiver then comprises a certain number of ordinary vacuum tubes (or two-plate vacuum tubes according to the present invention arranged for distortionless amplification as hereinbefore set forth), adapted to amplify radio frequency potentials, followed by a two-plate tube according to this invention, serving as power detector and acting directly upon the loudspeaker, the latter, for well-known reasons, being preferably shunted by a small capacity.

The invention likewise embraces the use of such tube to take the place of an ordinary detector with shunted capacity in amplifying voltmeters and similar apparatus whenever the main desideratum is to utilize to advantage the properties hereinbefore outlined of the ideal detector.

For undistorted amplification, the working point is chosen approximately in the middle of the characteristic (point B, Fig. 2), so as to insure sensibly symmetric oscillations of the output current upon either side of the operating point. It will be noted that the absence of current in the input circuit makes it possible to unite a great number of similar tubes for amplification as well as for detection or rectification without the preceding tube being loaded. Fig. 4 shows the circuit arrangement of an af or rf amplifier comprising cascade-connected tubes and air-core or iron-core transformers. This scheme in which the same elements are denoted in the same manner as in Fig. 3 is not in need of any explanation.

By providing an oscillation circuit (stopper) in the output circuit, and a coil magnetically coupled with that of the oscillation circuit, in the input circuit, it is feasible to start and maintain oscillations similarly as in ordinary triode tubes. The oscillation circuit could also form a part of the input circuit and the coupling coil form part of the output circuit. Fig. 5 represents the general scheme of a wave-generator comprising two coupled oscillation circuits. According to the particular purpose in hand, the condenser in the one or in the other circuit may be eliminated.

The same tube could also be employed to act as a self-modulating generator. When recourse is had to the scheme shown in Fig. 6 and when rf oscillations are maintained, it is found that the amplitude of these oscillations is a function of the auxiliary D. C. potential Vc (abscissa, Fig. 7) furnished by the battery of celles 2 in the input circuit. By varying the battery potential in any well known way, the amplitude of wave may be varied. The curve shown in Fig. 7 represents graphically the said function. It will thus be seen that when using the circuit arrangements as illustrated in Fig. 6a, in which a low-frequency A. C. potential is superposed upon the D. C. potential governing the working point (point A in Fig. 7), radiophonic or telephonic modulation by carrier current is realized. The A. C. potential may be applied thru transformer coils $e-g$, or equivalent means. As the curve is straight over a large part of its length, the modulation thus obtained may be made very marked and free from distortion, the amplitude of the carrier wave being proportional to the amplitude of the low-frequency potential applied at the input circuit. The working point must be so chosen that the carrier wave will be about one-half of that obtained by short-circuiting the input electrodes. It will be seen moreover that this modulation requires the production of a very small low-frequency power to cover the dielectric losses in the supports of electrodes of the tube and the ohmic insulation of these supports. The reactive power that is absorbed is caused by internal capacity of the tube which may be very low. The smallness of the modulating energy that is required is one of the most notable features of the mode of modulation here disclosed.

Fig. 8 illustrates another circuit arrangement for the modulation of a rf wave. In this scheme, the grid of the tube is utilized both for the maintenance of the oscillations as well as for modulation.

In using the scheme shown in Fig. 9 where the input circuit of the tube is controlled by an rf wave (frequency $f$) and where the output circuit carries rf oscillations (frequency very close to $f'$), the modulation characteristic Fig. 7 shows that the current finally obtained will have this form:

$$-\cos 2(f-f')t + \cos 2(f+f')t$$

and two waves are finally obtained at the output end of the tube, one of frequency $f+f'$ and the other one $f-f'$. Hence, in this manner and by simple means, reception by change of frequency as obtained by modulation is realized.

Having thus described my invention, what I claim is:

1. An electron discharge device comprising an electron-emitting cathode, a control electrode, a main anode and an auxiliary anode, said control electrode, main anode and auxiliary anode being arranged in substantially circular symmetry around said cathode, said auxiilary anode being arranged externally of the main anode.

2. An electron discharge device comprising an electron-emitting cathode, a control electrode, a main anode and an auxiliary anode, said control electrode, main anode and auxiliary anode being arranged in substantially circular symmetry around said cathode, said auxiliary anode having a positive potential applied thereto and being arranged externally of the main anode.

3. The combination of an electron discharge tube having a filament, a control grid, a main plate and an auxiliary plate, an input circuit connected between auxiliary plate and control grid, said circuit including a source of positive potential connected to said auxiliary plate, and an output circuit connected between filament and main plate.

4. The combination with an electron discharge device having an auxiliary plate in addition to the usual cathode, a plate and grid electrodes, said electrodes being arranged in substantially circular symmetry with respect to one another, of an input circuit connected between grid and auxiliary plate, and an output circuit connected between filament and main plate.

5. An amplifying apparatus comprising an electron discharge device having an electron-emitting cathode, an anode, a control grid interposed between cathode and anode, an auxiliary anode arranged externally of said first-mentioned anode, and independent circuit connections between cathode and main anode and between control grid and auxiliary anode, respectively.

6. The combination with an electron discharge device having an electron-emitting cathode and a cooperating anode, of a source of potential for producing a flow of current between said electrodes, and means for controlling said current flow comprising a control electrode, an auxiliary anode raised to a positive potential, and an input circuit connected therebetween.

7. The combination with an electron discharge device having an electron-emitting cathode and a cooperating anode, a control grid and an auxiliary anode, of an output circuit, including a source of potential, connected between cathode and cooperating anode for producing a flow of current therebetween, and an independent circuit connected between control grid and auxiliary anode for controlling the current in the output circuit, the current in said independent circuit being of substantially zero value.

8. The combination with an electron discharge device having an electron-emitting cathode and a cooperating anode, a control grid and an auxiliary anode, of an output circuit, including a source of potential, connected between cathode and cooperating anode for producing a flow of current therebetween, a source of positive potential connected to the auxiliary plate, and an independent circuit connected between said positively biased auxiliary plate and control grid for controlling the current in the output circuit.

9. The method of operating a four electrode thermionic amplifier having an auxiliary anode in addition to the usual cathode, anode and grid electrodes, which consists in producing a flow of current between anode and cathode by connecting a source of high potential therebetween, applying a source of comparatively low positive potential to said auxiliary anode, and controlling the anode-cathode flow of current by impressing a variable potential between grid and auxiliary anode.

ILIA PODLIASKY.